Patented June 24, 1947

2,423,074

UNITED STATES PATENT OFFICE 2,423,074

SOLUBLE COMPOUNDS OF RIBOFLAVIN AND PROCESS OF MANUFACTURE THEREOF

Margaret Rose Zentner, Newark, N. J., assignor to Hoffmann-La Roche Inc., Nutley, N. J., a corporation of New Jersey No Drawing. Application August 2, 1945, Serial No. 608,606

8 Claims. (Cl. 260—211)

My invention relates to a new class of chemical compositions, and to processes for making the same. More particularly, the new chemical compositions are complex products of riboflavin and gallic acid.

The principal object of my invention is to provide a soluble modification of riboflavin.

Another object of my present invention is the provision of a new class of chemical compositions which are, in general, products formed by the reaction between riboflavin and gallic acid, preferably in the presence of water or an inorganic acid such as sulphuric acid, phosphoric acid and hydrochloric acid.

An additional object is to provide a composition suitable for conversion to my novel riboflavin modifications.

The solubility of riboflavin in solvents ordinarily used in pharmaceutical or food products is very limited. For example, solubility of this vitamin in water and in ethyl alcohol is extremely low.

I have discovered that the solubility of riboflavin can be greatly increased by treating it with gallic acid. The product which is formed has the desired physiological activity of riboflavin; but has far greater solubility than untreated riboflavin.

The treatment of riboflavin with gallic acid is preferably carried out in the presence of a dilute acid. However, an aqueous medium can be employed without additional acid. After the process is carried out, any excess acid, such as gallic acid, may be neutralized, if desired, with an alkaline material, such as, ammonium hydroxide.

The full significance of the invention will be made apparent by the following examples, which are illustrative of the manner of producing some of the compositions contemplated herein and which will serve as a guide for those skilled in the art to produce other similar compounds. The reactions of the following examples were carried out under normal atmospheric pressure.

Example I 1 gram of riboflavin, 4 grams of gallic acid, and 16 cc. of sulphuric acid, (prepared from 1 cc. of concentrated sulphuric acid and 15 cc. of water) are interacted for 1½ hours, at the boiling temperature in a flask immersed in an oil bath heated to 120° to 130° C., and connected with a reflux condenser.

Example II

The reaction of Example I is carried out in a boiling water bath at 100° C., the required time being 4 hours, instead of 1½ hours.

Example III 1 gram of riboflavin and 0.5 gram of gallic acid are heated for 35 minutes with dilute sulphuric acid prepared from 1 cc. of concentrated sulphuric acid and 5.5 cc. of water. The reaction was carried out as in Example I.

Example IV

The process as in Example III is carried out with 1.5 grams of gallic acid, instead of 0.5 gram.

Example V

The process of Example III is carried out using 4 grams of gallic acid instead of 0.5 gram, and 15 cc. of water instead of 5.5 cc.

Example VI 1 gram of riboflavin, 0.5 gram of gallic acid, 4 cc. of 85% phosphoric acid, and 4 cc. of water are refluxed for four hours, on an oil bath maintained at 120° to 130° C., and with a reflux condenser.

Example VII 1 gram of riboflavin, 4 grams of gallic acid, and 100 cc. of 1% hydrochloric acid are refluxed for two hours, on an oil bath maintained at 120° to 130° C.

Example VIII 1 gram of riboflavin, 1.5 grams of gallic acid, 100 cc. of 85% lactic acid U. S. P. and 5 cc. of water are refluxed for two hours, on an oil bath maintained at 120° to 130° C.

Example IX 1 gram of riboflavin, 0.5 gram of gallic acid, 12.5 cc. of 85% lactic acid, U. S. P., and 2.4 cc. of water are refluxed for four hours, on an oil bath maintained at 120° to 130° C.

Example X 1 gram of riboflavin, 0.5 gram of gallic acid, 2.5 cc. of 85% phosphoric acid, and 2.5 cc. of water are refluxed for four hours, on an oil bath maintained at 120° to 130° C.

Example XI 1 gram of riboflavin, 4 grams of gallic acid and 6.5 cc. of water are refluxed for 30 minutes, on an oil bath maintained at 120° to 130° C.

The reaction mixtures of the examples can be diluted with a suitable solvent, such as water, ethyl alcohol, propylene glycol and glycerol, for use for medicinal or food purposes.

It is pointed out that the concentration of the acid, such as the sulphuric acid, phosphoric acid, or hydrochloric acid, may be varied. In general, a decrease in concentration decreases the speed of reaction.

The mechanism of the modification is not clear. It may be that complex compounds are obtained. However, I have not been able to ascertain the exact nature of the ultimate product.

I claim:

1. A process of preparing a riboflavin modification, which comprises reacting in the presence of heat riboflavin with gallic acid in the presence of a dilute acid selected from the group consisting of sulphuric acid, phosphoric acid, and hydrochloric acid.

2. A process which comprises reacting in the presence of heat riboflavin with gallic acid in the presence of dilute sulphuric acid.

3. A process which comprises reacting in the presence of heat riboflavin with gallic acid in the presence of dilute phosphoric acid.

4. A process which comprises reacting in the presence of heat riboflavin with gallic acid in the presence of dilute hydrochloric acid.

5. The product produced by the process of claim 1.

6. The product produced by the process of claim 2.

7. The product produced by the process of claim 3.

8. The product produced by the process of claim 4.

MARGARET ROSE ZENTNER.

REFERENCES CITED

The following references are of record in the file of this patent:

UNITED STATES PATENTS

| Number | Name | Date |
| --- | --- | --- |
| 2,395,378 | Miller | Feb. 19, 1946 |
| 2,349,986 | Preiswerk | May 30, 1944 |